US005733184A

United States Patent [19]
Curry et al.

[11] Patent Number: 5,733,184
[45] Date of Patent: Mar. 31, 1998

[54] MEAT PROCESSING ARTICLE, APPARATUS, AND METHOD

[75] Inventors: Mark Henry Curry, Rogers; Donald Mark Zimmerman, Springdale; Kelvin Donald Lasse; Bobby Z. Haley, both of Fayetteville, all of Ark.

[73] Assignee: Tyson Holding Company, Wilmington, Del.

[21] Appl. No.: 587,720

[22] Filed: Jan. 19, 1996

[51] Int. Cl.⁶ .................................................. A22C 17/04
[52] U.S. Cl. ............................ 452/138; 452/111; 452/149
[58] Field of Search ........................... 452/111, 112, 452/113, 138; 241/74, 82.3, 24, 23, 247

[56] References Cited

U.S. PATENT DOCUMENTS

| | | |
|---|---|---|
| 2,660,756 | 12/1953 | Darrow et al. .............................. 452/111 |
| 4,608,732 | 9/1986 | Hill et al. ................................... 452/111 |
| 5,039,295 | 8/1991 | Cheung ...................................... 452/174 |
| 5,316,225 | 5/1994 | Greyer ........................................ 241/74 |
| 5,472,377 | 12/1995 | Andrews et al. .......................... 452/149 |
| 5,580,305 | 12/1996 | McFarland ................................. 452/138 |

*Primary Examiner*—Willis Little
*Attorney, Agent, or Firm*—Dougherty & Hessin, P.C.

[57] ABSTRACT

An article, an apparatus, and a method for processing a meat product. The inventive article comprises: a shaft; a spiral conveying channel on the exterior of the shaft; and a cutting member projecting from the shaft and positioned within the conveying channel. The inventive apparatus comprises the inventive article and a driving assembly for rotating the inventive article about its longitudinal axis. The inventive method comprises the step of conveying a meat item through the conveying channel of the inventive article such that the cutting member contacts and forms a cut in the meat item.

27 Claims, 6 Drawing Sheets

MEAT PROCESSING ARTICLE, APPARATUS, AND METHOD

FIELD OF THE INVENTION

The present invention relates to articles, apparatuses, and methods for processing meat products. More particularly, but not by way of limitation, the present invention relates to articles, apparatuses, and methods for processing poultry.

BACKGROUND OF THE INVENTION

A continuous automated poultry cut-up machine will typically include: breast removal/cutter stations; a wing cutting station; a carcass splitting station; a back removal station; and a drum-thigh separation station. Eviscerated poultry carcasses are typically conducted through the cut-up machine by means of a shackle conveyor. After being separated at the drum-thigh separation station, the legs and thighs can be conveyed to additional processing areas where they are battered, breaded, and cooked. The cooked legs and thighs will typically be frozen for sale to consumers.

Problems currently exist in the automated processing and cooking of chicken thighs and of other poultry thigh products. Lengthy cooking times are required to ensure that the meat near the thigh bone is sufficiently cooked. Additionally, due to the presence of an artery extending into the thigh bone, a substantial amount of heat must be delivered into the thigh bone in order to coagulate any blood contained therein. When freezing a cooked thigh product, uncoagulated blood contained within the thigh bone can expand out of the bone and into the cooked thigh meat.

A need presently exists for a system which resolves these problems. A need particularly exists for such a system capable of operating automatically and continuously in conjunction with existing poultry cut-up machines.

SUMMARY OF THE INVENTION

The present invention satisfies the needs and resolves the problems discussed hereinabove. The present invention provides: an article for processing a meat product; an apparatus for processing a meat product; and a method for processing a meat product. The article, apparatus, and method of the present invention are particularly well suited for processing poultry.

The inventive article comprises: a shaft having an exterior and having a longitudinal axis; a spiral conveying channel on the exterior of the shaft; and cutting means for cutting an item conveyed within the conveying channel. The cutting means projects from the shaft and is positioned within the conveying channel.

The inventive apparatus comprises an inventive article of the type just described and a rotating means for rotating the article about its longitudinal axis. The inventive apparatus also preferably comprises a guiding and holding means for guiding items into and holding items in the article's spiral conveying channel.

The inventive method uses a device including: a shaft having an exterior and having a longitudinal axis; a conveying channel on the exterior of the shaft; and a cutting member projecting from the shaft and positioned within the conveying channel. The inventive method comprises the step of conveying a meat item through the conveying channel such that, as the meat item is conveyed through the channel, the cutting member contacts and forms a cut in the meat item. In one embodiment of the inventive method, a poultry carcass portion comprising a leg and a thigh is conveyed through the conveying channel such that the cutting member contacts and forms a cut in the meat portion of the thigh adjacent to the thigh bone.

Further objects, features, and advantages of the present invention will be apparent to those skilled in the art upon reference to the accompanying drawings and upon reading the following description of the preferred embodiments.

DESCRIPTION OF THE PREFERRED EMBODIMENTS

An embodiment 2 of the inventive apparatus is depicted in FIGS. 1–4. Inventive apparatus 2 comprises: a frame structure 4; a pair of auger structures 6 and 8; a pair of product guiding members 10 and 12; a driving assembly 14; and a mounting structure 16.

Each of auger structures 6 and 8 preferably comprises an elongate shaft 18 having: a tapered, preferably frustoconical, central portion 20; a forward, cylindrical end portion 22 adjacent the forward end (i.e., the small diameter end) of central portion 20; a large diameter cylindrical portion 24 adjacent the rearward end of central portion 20; and a rearward, small diameter, cylindrical end portion 26 extending rearwardly from large cylindrical portion 24. Augers 6 and 8 are preferably mounted adjacent to each other such that the longitudinal axis of shaft 18 of auger 6 is parallel to the longitudinal axis of shaft 18 of auger 8.

Each of auger structures 6 and 8 further comprises a spiral conveying channel 28 provided on the exterior of tapered central portion 20. In each case, spiral conveying channel 28 is positioned around the longitudinal axis of shaft 18 such that items can be conveyed through channel 28 by rotating shaft 18 about its longitudinal axis. Each of auger structures 6 and 8 also includes a cutting member 30 projecting from the exterior of tapered central portion 20. Cutting members 30 are located within spiral conveying channels 28.

Figure 5:
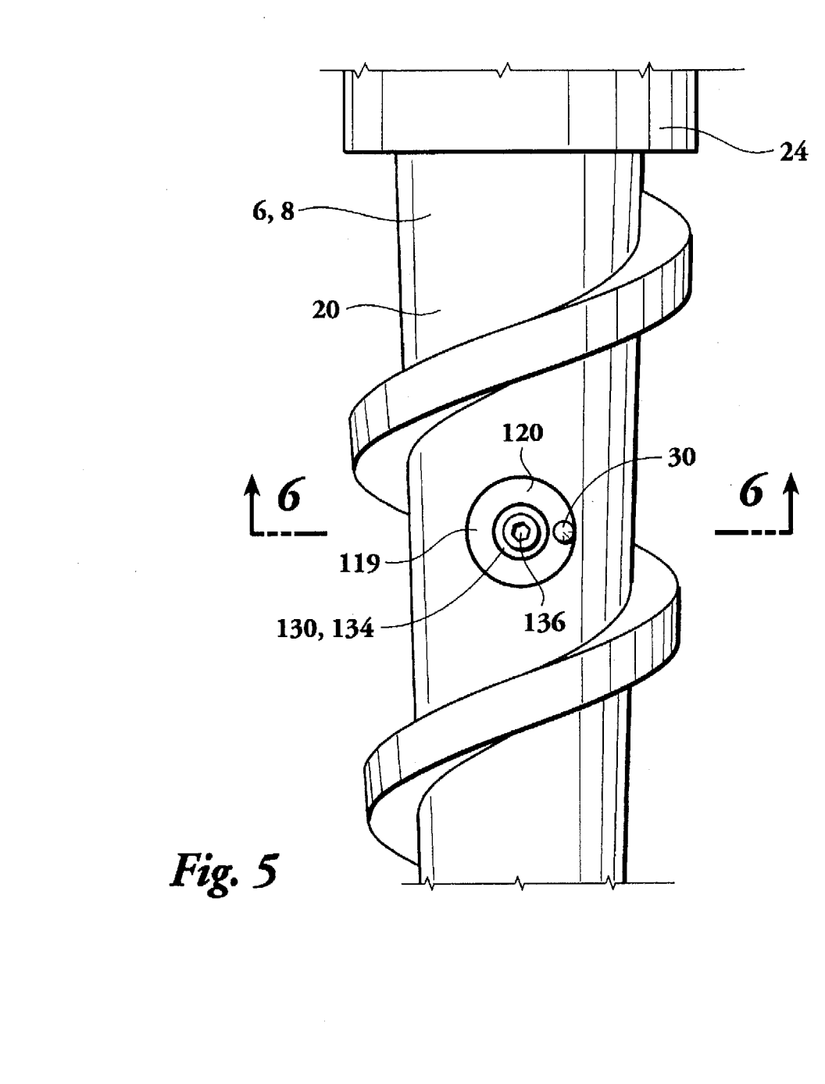
FIG. 5 provides a plan view of a portion of an auger 6 or 8 used in inventive apparatus 2.
Figure 6:
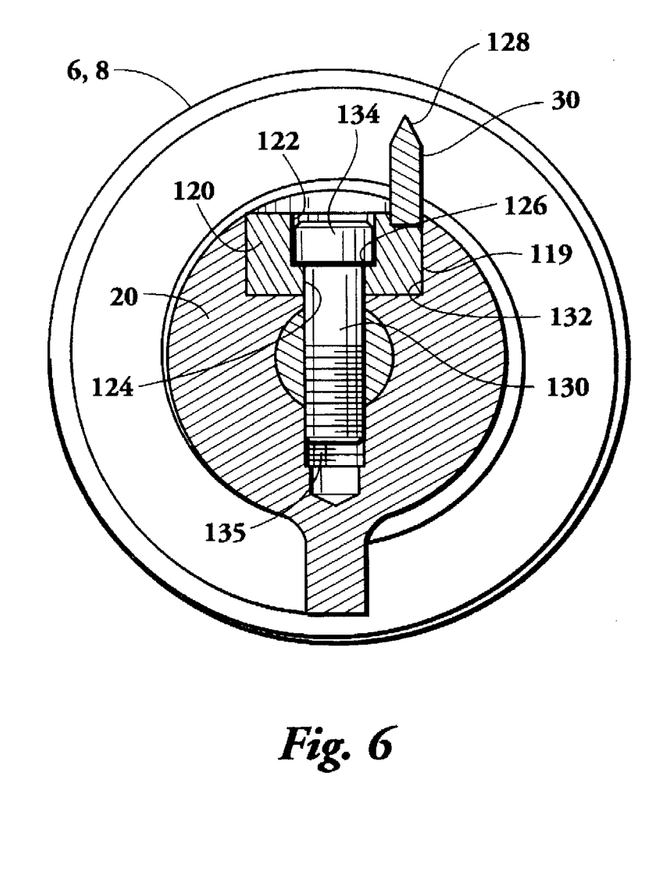
FIG. 6 provides a cutaway end view of auger 6 or 8 taken from the perspective 6—6 indicated in FIG. 5.

Each cutting member 30 is preferably included in a cutter assembly 119 of the type depicted in FIGS. 5 and 6. Each cutter assembly 119 preferably also includes a cylindrical base structure 120 having: a first cylindrical bore 122 extending into the upper end of base 120; a second cylindrical bore 124 extending from bore 122 through the bottom of base 120, second bore 124 having a diameter smaller than the diameter of first bore 122; and an interior radial shoulder 126 formed by the transition from large diameter first bore 122 to small diameter second bore 124. In each case, first bore 122 is sized for receiving the head 134 of an allen bolt 130 such that head 134 will abut interior radial shoulder 126.

Cutting members 30 project from the upper ends of base structures 120. Each cutting member 30 is preferably a small diameter, elongate, cylindrical member having a pointed (preferably conical) distal end 128.

Cutter assemblies 119 are installed in augers 6 and 8 such that cutting members 30 project from the exteriors of tapered auger portions 20 and are positioned within spiral conveying channels 28. Cutter assemblies 119 are installed in each of augers 6 and 8 by means of a large bore 132 extending laterally into the auger and a threaded bore 135 extending laterally from large bore 132 through the longitudinal axis of the auger. The head 134 of allen bolt 130 has a socket 136 formed therein for receiving an allen wrench. The large bores 132 extending laterally into augers 6 and 8 are sized such that cutter assembly base structures 120 are fully received therein. Base structures 120 are held in fixed position in auger bores 132 by feeding allen bolts 130 through base structure bores 122 and 124 and tightening bolts 130 within threaded lateral bores 135.

Using cutter assemblies 119, the positions of cutting members 30 within spiral conveying channels 28 can be easily adjusted to provide optimum cut location. The positions of cutting members 30 are adjusted by loosening bolts 130, rotating base structures 120 within auger bores 132 to achieve a desired cutting member location, and then retightening bolts 130.

Although cutter assemblies 119 of the type depicted in FIGS. 5 and 6 are presently preferred, those skilled in the art will understand that alternative types of cutting structures could also be used in inventive apparatus 2. For example, cutter assemblies 119 could be replaced with fixed, pointed, cone-shaped members which project from the exterior augers 6 and 8. Such structures would operate to cut items traveling through conveying channels 28 but would not be adjustable to ensure optimum cut location.

Frame structure 4 comprises: a base plate 32; a brace structure 34 extending vertically from the rearward end of base plate 32; a pair of support attachment brackets 36 secured to one side of base plate 32; a second pair of support attachment brackets 38 secured to the other side of base plate 32; a first pair of L-shaped guide member supports 40 attached to brackets 36; a second pair of L-shaped guide member supports 42 attached to brackets 38; a horizontally extending brace member 41 connected between guide member supports 40 near the upper ends thereof; a horizontally extending brace member 43 connected between guide member supports 42 near the upper ends thereof; and an auger support 44 extending upwardly from the forward end of base plate 32. Brace structure 34 has apertures provided therein for rotatably receiving cylindrical rearward end portions 26 of augers 6 and 8. Preferably, end portions 26 extend through these apertures and are rotatably received in plastic bearings 27 secured to brace structure 34.

Figure 1:
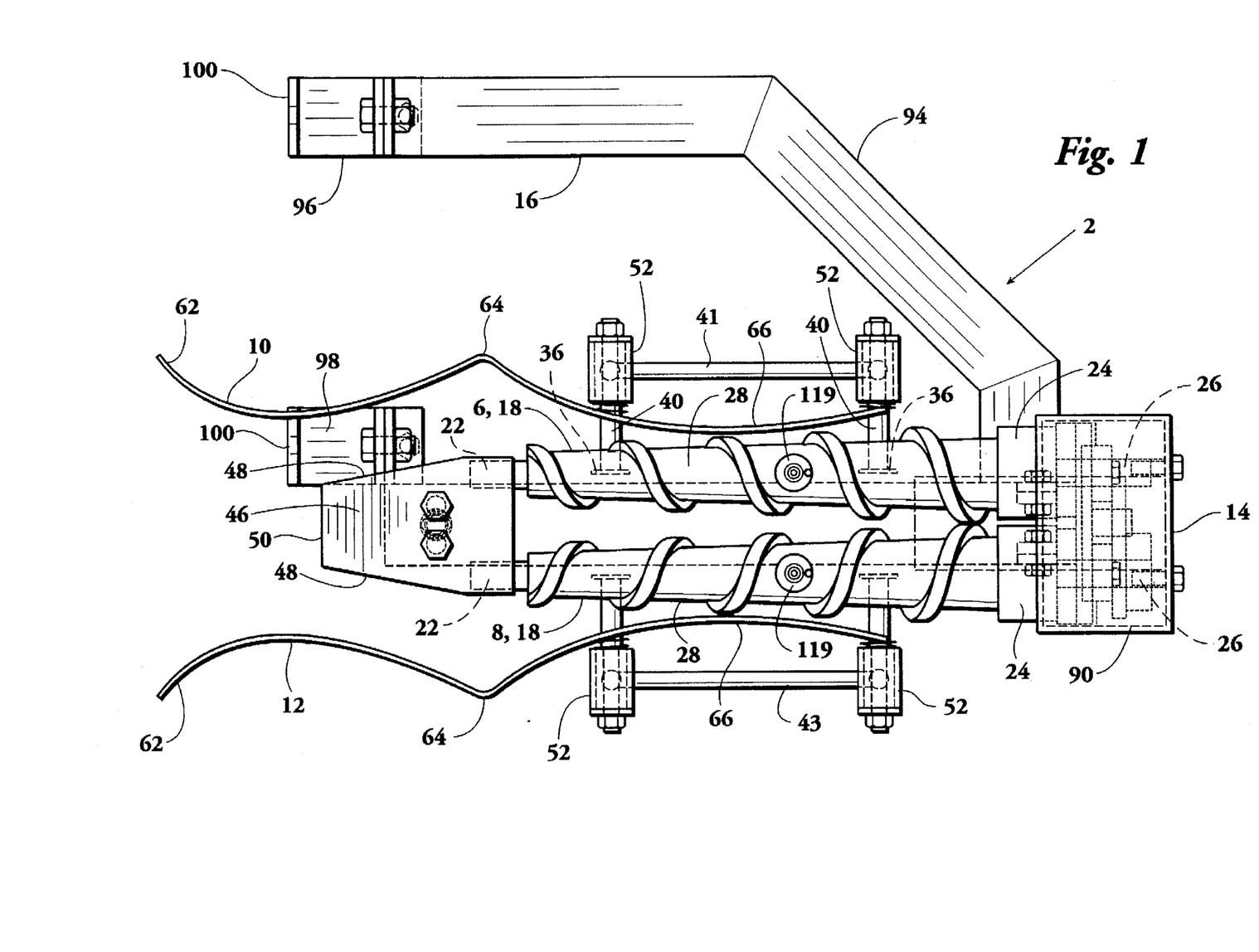
FIG. 1 provides a plan view of an embodiment 2 of the inventive apparatus.

Forward end portions 22 of augers 6 and 8 are rotatably secured and supported by a plastic bearing structure 46 attached to the upper end of auger support 44. Bearing structure 46 has cylindrical cavities provided therein for rotatably receiving the cylindrical end portions 22 of augers 6 and 8. As depicted in FIG. 1, bearing structure 46 also preferably includes a forward portion having sides 48 which taper inwardly toward the forward end 50 of bearing structure 46. Structure 46 is thereby shaped to cooperate with product guiding members 10 and 12 in guiding items into spiral conveying channels 28.

Product guiding members 10 and 12 are secured to the upper ends of guide member supports 40 and 42 by means of spring-loaded attachment assemblies 52. Each assembly 52 preferably comprises: a housing 54 having an aperture extending therethrough; a piston 56 reciprocatingly received in said aperture and having an inner end attached (e.g., by welding or other means) to the exterior side of a product guiding member 10 or 12; a spring 58 positioned around piston 56 between housing 54 and product guiding member 10 or 12; and a nut 60, or other member, attached to the outer end of piston 56 and having a diameter larger than that of the aperture of housing 54 such that nut 60 retains piston 56 in housing 54.

Each of product guiding members 10 and 12 is preferably a wide, elongate, strip-like member having something of a rounded W shape. The outwardly curving forward ends 62 of members 10 and 12 operate to receive and channel items into inventive apparatus 2. The outwardly projecting central portions 64 of guiding members 10 and 12 work together with the narrow forward ends of augers 6 and 8 for loosely presenting items to spiral conveying channels 28 such that said items move into channels 28 rather than being pinned by the projecting spiral ridges of channels 28 against guiding members 10 and 12. After said items are properly positioned in channels 28, the inwardly curving rearward portions 66 of guiding members 10 and 12 operate with the increasing diameter of augers 6 and 8 to ensure that, at the time the items are contacted by cutting members 30, the items are firmly held against auger shafts 20. Spring-loaded attachment assemblies 52 allow product guiding members 10 and 12 to move laterally with respect to augers 6 and 8 in order to accommodate variations in item size and thereby prevent item damage.

As will be apparent to those skilled in the art, any one of numerous alternative driving systems could be used for operating inventive apparatus 2. In the presently preferred embodiment, driving assembly 14 comprises: a motor 68 (preferably hydraulic) mounted on vertical brace structure 34; a drive chain sprocket 70 secured on the drive shaft 72 of motor 68; a drive chain sprocket 74 secured on rearward end portion 26 of auger 8; a drive chain 76 operably linking sprockets 70 and 74; a first gear 78 secured on rearward end portion 26 of auger 8; and a second gear 80 secured on rearward end portion 26 of auger 6. Second gear 80 is operably intermeshed with first gear 78.

As viewed from the rearward end 82 of inventive apparatus 2, drive chain 76 turns auger 8 in a counterclockwise direction about the longitudinal axis of auger 8. As auger 8 is driven in a counterclockwise direction, the direct linkage of gears 78 and 80 causes auger 6 to turn about its longitudinal axis in a clockwise direction. As a result of the counterclockwise rotation of auger 8 and the clockwise rotation of auger 6, all items conveyed between augers 6 and 8 and product guiding members 10 and 12 are urged by augers 6 and 8 in a downward direction. The downward pull provided by the rotation of augers 6 and 8 assists in retaining the conveyed items in spiral conveying channels 28 and helps maintain said items in taut position during the cutting operation.

A vertical slot 84 is preferably provided in vertical brace structure 34 for receiving the drive shaft 72 of motor 68. Additionally, vertical slots 86 are preferably provided in brace structure 34 for receiving motor attachment bolts 88. Slots 84 and 86 allow sufficient vertical adjustment of motor 68 for installing, tightening, and removing drive chain 76.

A removable cover 90 is preferably provided for covering and protecting driving assembly 14. Rearwardly projecting internally threaded sockets 92 are preferably provided on vertical brace structure 34 for bolting cover 90 in fixed position on the rearward end 82 of inventive apparatus 2.

Depending on the specific application chosen, any one of numerous structures can be used for operably mounting inventive apparatus 2. FIGS. 1-4 depict a mounting structure 16 useful for operably incorporating inventive apparatus 2 in one type of existing poultry cut-up machine. Mounting structure 16 comprises: a curved mounting frame 94; a first mounting bracket 96 secured to one leg of frame 94; and a second mounting bracket 98 secured to the other leg of frame 94. Each of mounting brackets 96 and 98 includes a forward flange 100 having apertures extending therethrough for bolting apparatus 2 in position on the cut-up machine.

The rearward end of frame structure base plate 32 is preferably pivotably attached to mounting frame 94. Bracket members 102 extending upwardly from mounting frame 94 mate with bracket members 104 extending downwardly from the rearward end of base plate 32 whereby base plate 32 is pivotably connected to mounting frame 94 by means of bolts 106.

Figure 4:
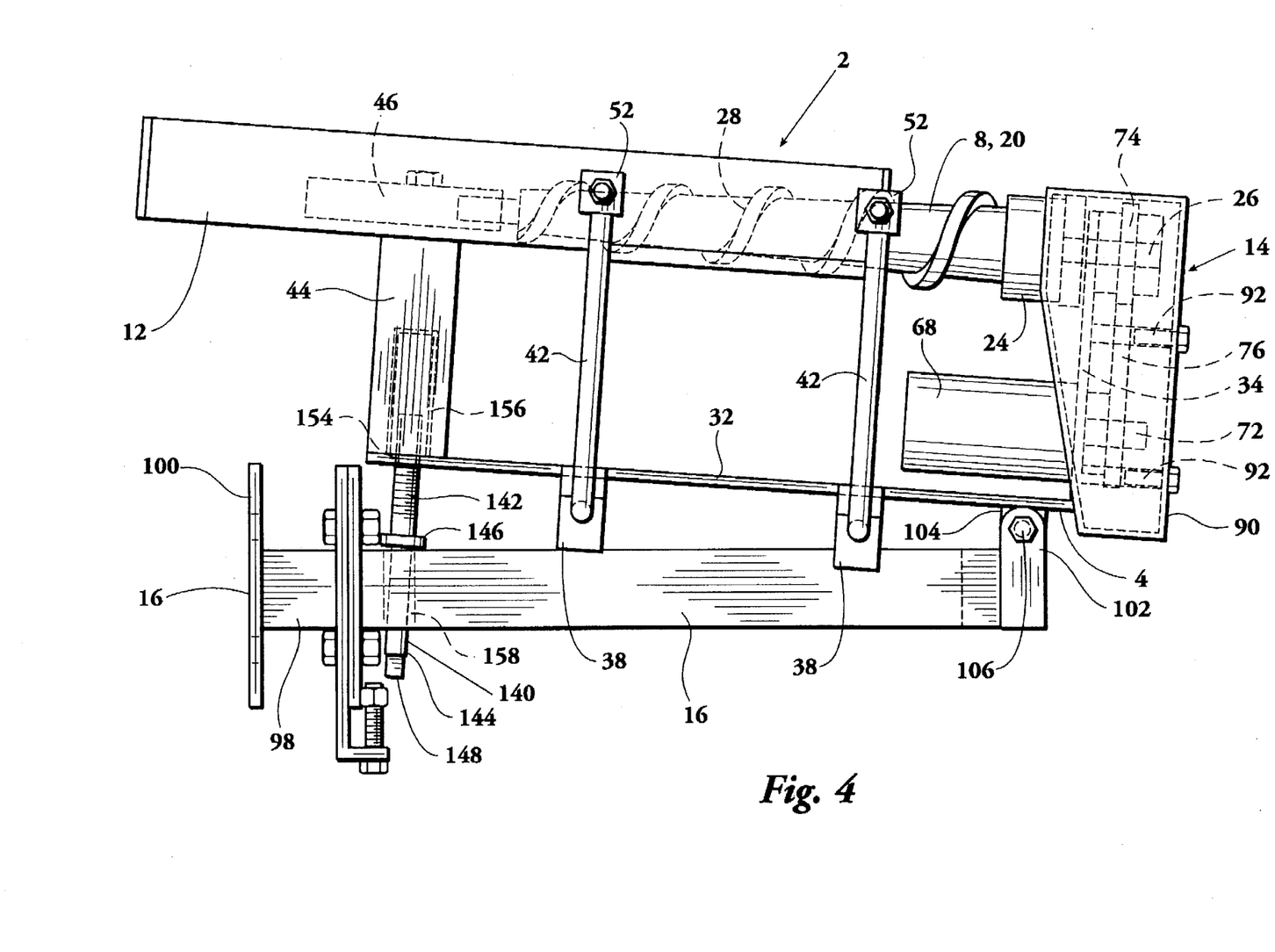
Figure 7:
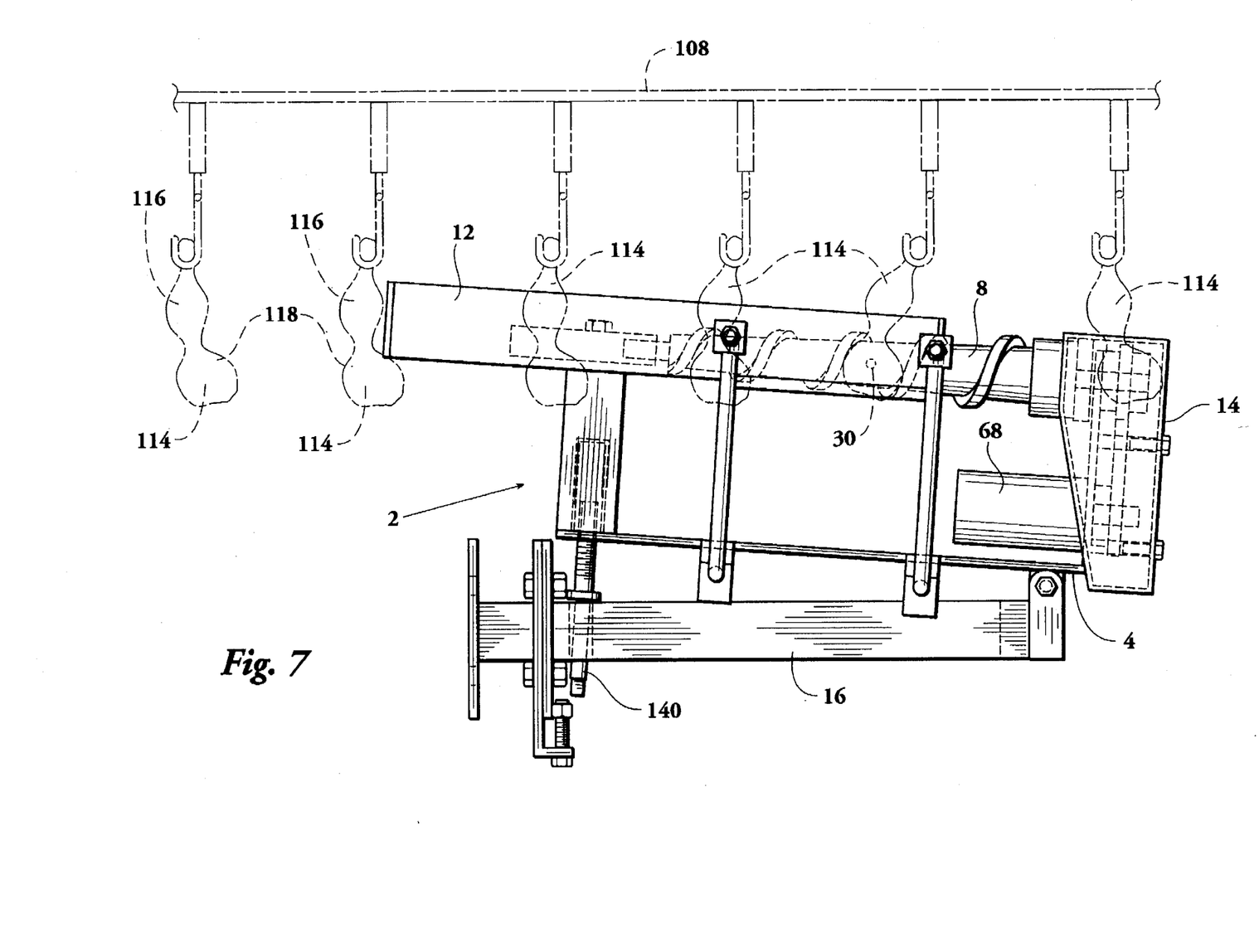
FIG. 7 provides an elevational side view of inventive apparatus 2 with poultry leg-thigh quarters 112 being conducted therethrough.

When feeding items through inventive apparatus 2 by means of a horizontally running overhead shackle conveyor 108, the forward ends of augers 6 and 8 are preferably tilted slightly upward as shown in FIGS. 4 and 7. Tilting the forward ends of augers 6 and 8 upward in this manner facilitates the delivery of hanging poultry leg quarters 112, 114 into the inventive apparatus by positioning augers 6 and 8 to initially catch said quarters at the leg-thigh joint. Once received in spiral conveying channels 28, the downward inclination and rotation of augers 6 and 8 pull the leg quarters downward as they are conveyed toward the rearward end of apparatus 2.

The angle of inclination of augers 6 and 8 can be adjusted and maintained by means of an adjustment bolt 140. Adjustment bolt 140 comprises: an upper, elongate, threaded portion 142; a lower elongate portion 144; a radially projecting ring 146 provided between lower elongate portion 144 and upper threaded portion 142; and a grippable, flat-sided, lower end 148. Threaded upper portion 142 is operably received in a threaded aperture 154 formed through the forward end of frame base plate 32. Any part of threaded upper portion 142 extending upwardly beyond threaded aperture 154 is preferably received in a housing 156 provided within auger support 44.

Lower elongate portion 144 of adjustment bolt 140 extends through an aperture 158 provided in mounting frame 94. The diameter of aperture 158 is sufficiently large to allow lower elongate portion 144 to rotate freely therein. However, the diameter of aperture 158 is smaller that the diameter of ring 146 such that ring 146 contacts the upper surface of mounting frame 94 and thereby limits the downward swinging movement of adjustment bolt 140 and of the forward end of base plate 32. Grippable lower end 148 of adjustment bolt 140 projects from the bottom of mounting frame 94 such that end 148 can be gripped and turned using a wrench or other instrument.

The angle of inclination of augers 6 and 8 is adjusted by simply gripping lower end 148 of adjustment bolt 140 and rotating bolt 140 about its longitudinal axis. As bolt 140 is rotated, the threaded upper portion 142 of bolt 140 turns within threaded aperture 154 of base plate 32 and thereby vertically displaces the forward end of base plate 32.

Motor 68 can generally be any standard type motor (e.g., hydraulic, electric, or other). When using inventive apparatus 2 as an addition to a hydraulically operated poultry cut-up machine, motor 68 will preferably be a hydraulic motor which is tied into the cut-up machine's main hydraulic operating system. Thus, after the hydraulic fluid flow to motor 68 is initially adjusted to thereby synchronize apparatus 2 with the cut-up machine at a given machine operating speed, subsequent changes in hydraulic flow to the cut-up machine will equally affect the operating speed of inventive apparatus 2 such that apparatus 2 will automatically remain in synchronization with the cut-up machine at all cut-up machine operating speeds.

Figure 2:
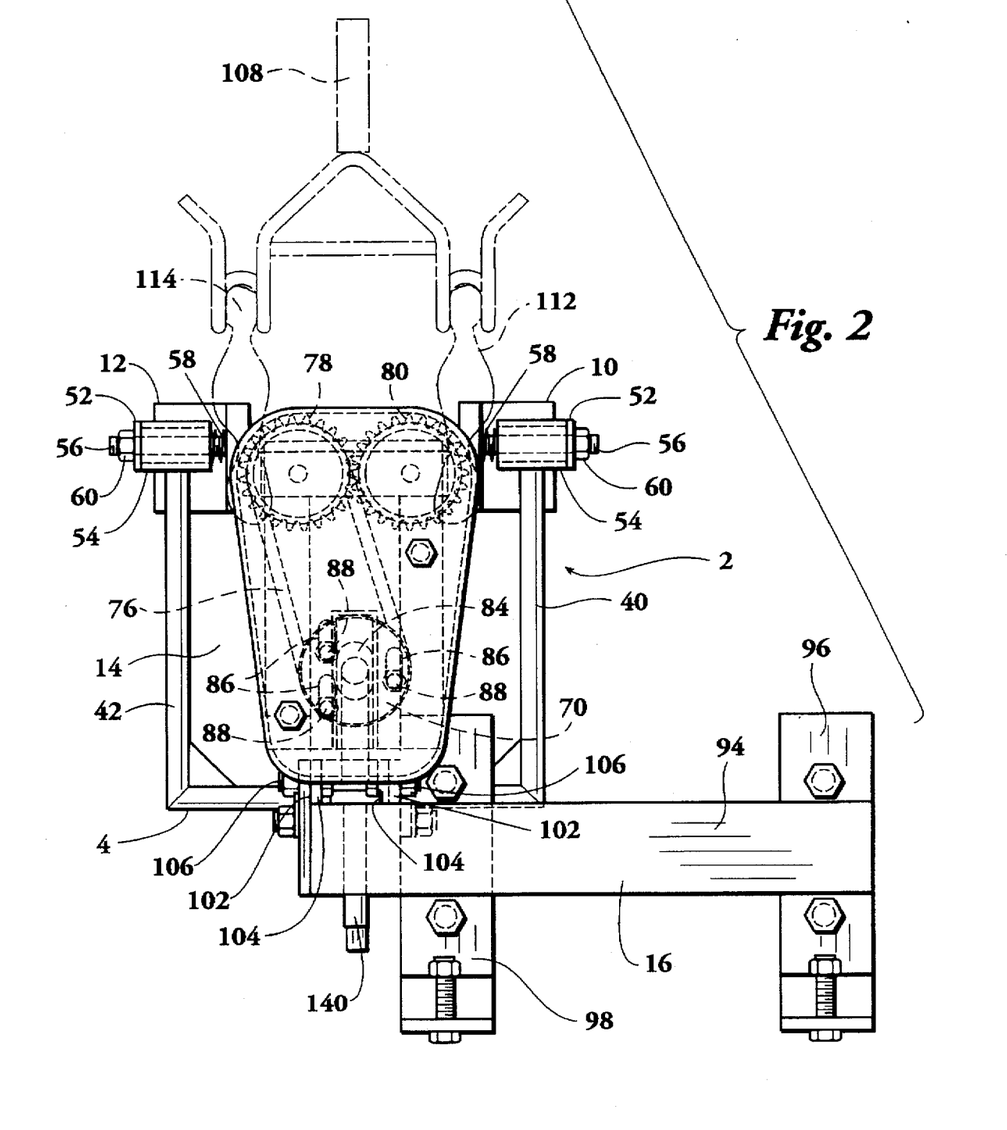
FIG. 2 provides an elevational end view of inventive apparatus 2.
Figure 3:
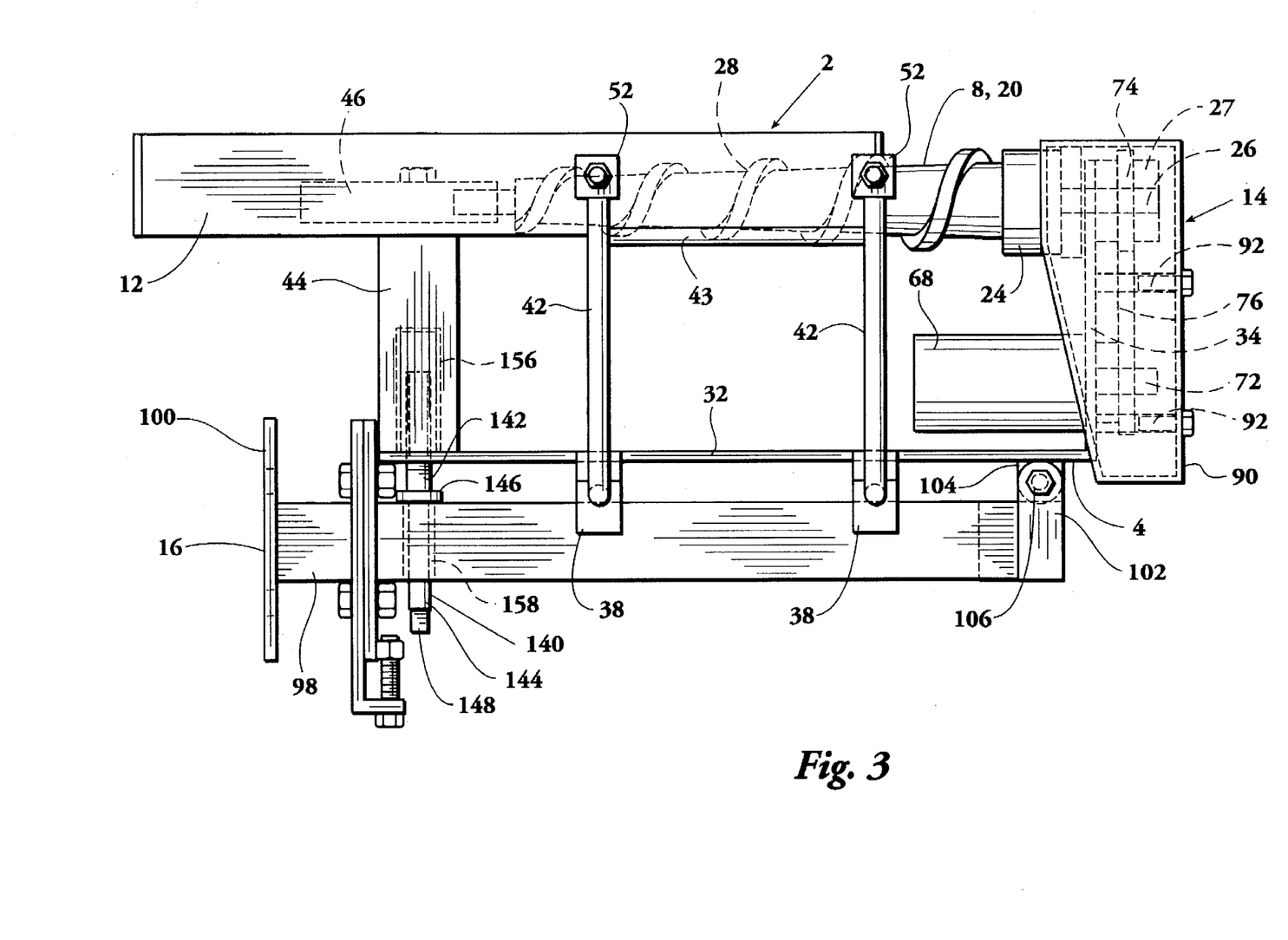
FIGS. 3 and 4 provide elevational side views of inventive apparatus 2.

When incorporated in a poultry cut-up machine of the type described above, inventive apparatus 2 is preferably installed either (a) between the carcass splitting station and the back removal station or (b) between the back removal station and the drum-thigh separation station. In either case, as depicted in FIGS. 2 and 7, each poultry product conveyed through inventive apparatus 2 will comprise two separated carcass portions 112 and 114 hanging from shackle conveyor 108. Each of portions 112 and 114 comprises a leg (drum) 116 and thigh 118. Conveyor 108 delivers portion 112 into the gap between auger 6 and product guiding member 10 whereby portion 112 is received in the spiral conveying channel 28 of auger 6. Portion 114, on the other hand, is delivered into the gap between auger 8 and product guiding member 12 such that portion 114 is received in the spiral conveying channel 28 of auger 8. The speed of rotation of augers 6 and 8 is preferably such that portions 112 and 114 are conveyed through conveying channels 28 at the same speed as shackle conveyor 108.

As portions 112 and 114 travel through conveying channels 28, cutting members 30 contact the inner sides of thighs 118 and form cuts/slits in the meat portions thereof. Each cutting member 30 is preferably positioned and sized to form a cut adjacent to the thigh bone. Preferably, each cut is approximately at least as deep as the inner side of the thigh bone. The resulting cuts greatly facilitate the delivery of heat into thighs 118 and ensure that the meat near the thigh bone and any blood remaining in the thigh bone are fully cooked.

As will be understood by those skilled in the art, although the preferred embodiment 2 of the inventive apparatus includes dual augers 6 and 8, an embodiment of the inventive apparatus having only a single auger could also be used. A single auger apparatus would be operable for receiving and processing leg quarters one-at-a-time.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An article for processing a meat item containing a bone, said article comprising:

a shaft having an exterior and longitudinal axis;

a spiral conveying channel having projecting spiral ridges on said exterior of said shaft; and cutting means, projecting from said shaft within said conveying channel between and spaced away from adjacent spiral ridges, for forming a cut in the meat item adjacent to the bone as the meat item is conveyed within said conveying channel.

2. An article for processing a meat item, said article comprising:

a shaft having a tapered exterior and a longitudinal axis;

a spiral conveying channel on said exterior of said shaft; and cutting means, protecting from said shaft and positioned within said conveying channel, for cutting an item conveyed within said conveying channel.

3. The article of claim 2 wherein said exterior of said shaft is shaped in the form of a frustum of a cone.

4. An apparatus for processing a meat item containing a bone, said apparatus comprising:
- a first article comprising:
  - a first shaft having an exterior and having a first longitudinal axis;
  - a first spiral conveying channel having projecting spiral ridges on said exterior of said first shaft; and
  - first cutting means, projecting from said first shaft within said first conveying channel between and spaced away from adjacent spiral ridges, for forming a cut in the meat item adjacent to the bone as the meat item is conveyed within said first conveying channel; and
- first rotating means for rotating said first article about said first longitudinal axis.

5. An apparatus for processing a meat item, said apparatus comprising:
- a first article comprising:
  - a first shaft having an exterior and having a first longitudinal axis;
  - a first spiral conveying channel on said exterior of said first shaft; and
  - first cutting means, projecting from said first shaft and positioned within said first conveying channel, for conveying first items conveyed within said first conveying channel;
- first rotating means for rotating said first article about said first longitudinal axis; and
- first guiding and holding means for guiding said items into and holding said items in said first conveying channel.

6. The apparatus of claim 5 wherein said first guiding and holding means is spring loaded.

7. The apparatus of claim 5 wherein said exterior of said first shaft is tapered.

8. The apparatus of claim 4 wherein said exterior of said first shaft has a frusto-conical shape.

9. The apparatus of claim 5 wherein said apparatus further comprises:
- a second article including
  - a second shaft positioned adjacent to said first shaft, said second shaft having an exterior and having a second longitudinal axis,
  - a second spiral conveying channel on said exterior of said second shaft, and
  - second cutting means, projecting from said second shaft and positioned within said second conveying channel, for cutting second items conveyed within said second conveying channel and
- means for rotating said second article about said second longitudinal axis.

10. The apparatus of claim 9 further comprising:
- first guiding and holding means for guiding said first items into and holding said first items in said first conveying channel and
- second guiding and holding means for guiding said second items into and holding said second items in said second conveying channel.

11. The apparatus of claim 10 wherein said first guiding and holding means and said second guiding and holding means are spring loaded.

12. The apparatus of claim 9 wherein said exteriors of said first and second shafts are tapered.

13. The apparatus of claim 9 wherein said exteriors of said first and second shafts have frusto-conical shapes.

14. The apparatus of claim 9 wherein said second longitudinal axis is substantially parallel to said first longitudinal axis.

15. A method of processing a meat item using a device including
- a shaft having an exterior and having a longitudinal axis,
- a conveying channel on said exterior of said shaft, and
- a cutting member projecting from said shaft and positioned within said conveying channel, said method comprising the step of conveying said meat item through said conveying channel such that, as said meat item is conveyed through said conveying channel, said cutting member contacts and forms a cut in said meat item.

16. The method of claim 15 wherein said step of conveying includes the step of rotating said shaft about said longitudinal axis.

17. The method of claim 16 wherein said step of conveying further includes the step of holding said meat item in said conveying channel.

18. The method of claim 15 wherein:
- said meat item is a poultry carcass portion comprising a leg and a thigh, said thigh comprising a meat portion and a thigh bone, and
- during said step of conveying, said cutting member forms said cut in said meat portion adjacent to said thigh bone.

19. A method of processing a poultry carcass using a device including
- a first shaft having an exterior and having a first longitudinal axis,
- a second shaft having an exterior and having a second longitudinal axis, said second shaft being positioned adjacent to said first shaft,
- a first conveying channel on said exterior of said first shaft,
- a second conveying channel on said exterior of said second shaft,
- a first cutting member projecting from said first shaft and positioned within said first conveying channel, and
- a second cutting member projecting from said second shaft and positioned within said second conveying channel, said method comprising the steps of:
(a) conveying a first portion of said poultry carcass, said first portion comprising a first leg and a first thigh, through said first conveying channel such that, as said first portion is conveyed through said first conveying channel, said first cutting member contacts and forms a first cut in said first thigh and
(b) conveying a second portion of said poultry carcass, said second portion comprising a second leg and a second thigh, through said second conveying channel such that, as said second portion is conveyed through said second conveying channel, said second cutting member contacts and forms a second cut in said second thigh.

20. The method of claim 19 wherein step (a) includes the step of rotating said first shaft about said first longitudinal axis and step (b) includes the step of rotating said second shaft about said second longitudinal axis.

21. The method of claim 20 wherein:
- said first shaft is rotated about said first longitudinal axis in step (a) in a first rotational direction,
- said second shaft is rotated about said second longitudinal axis in step (b) in a second rotational direction, and said first rotational direction is opposite said second rotational direction.

22. The method of claim 19 wherein:

step (a) includes the step of holding said first portion in said first conveying channel and step (b) includes the step of holding said second portion in said second conveying channel.

23. The method of claim 19 wherein:

said first thigh comprises a meat portion and a thigh bone;

said second thigh comprises a meat portion and a thigh bone;

in step (a), said first cutting member forms said first cut in said meat portion of said first thigh adjacent to said thigh bone of said first thigh; and in step (b), said second cutting member forms said second cut in said meat portion of said second thigh adjacent to said thigh bone of said second thigh.

24. The article of claim 1:

wherein the cutting means is further defined as being adjustably positionable between adjacent spiral ridges of the conveying channel.

25. The article of claim 1:

wherein the cutting means is located so that the cut is formed adjacent to but not in the bone.

26. The article of claim 1 in which the cutting means comprises:

an elongate, cylindrical member having a base end and a pointed distal end, the base end being connectable to the shaft between adjacent spiral ridges with the distal end extending from the shaft, the base end and distal end of the cylindrical member defining a longitudinal axis of the cylindrical member, the longitudinal axis of the cylindrical member being generally transverse to the longitudinal axis of the shaft.

27. The article of claim 1:

wherein the cutting means is positioned to form a cut in the meat item adjacent to the bone, the cut being at least as deep into the meat as the side of the bone nearest to the cutting means.

* * * * *

UNITED STATES PATENT AND TRADEMARK OFFICE
CERTIFICATE OF CORRECTION

PATENT NO. : 5,733,184

DATED : March 31, 1998

INVENTOR(S) : Mark Henry Curry; Donald Mark Zimmerman; Kelvin Donald Lasse; Bobby Z. Haley It is certified that error appears in the above-identified patent and that said Letters Patent is hereby corrected as shown below:

Column 6, line 65, change "protecting" to --projecting--.

Signed and Sealed this

Twenty-third Day of November, 1999

Attest:

Q. TODD DICKINSON

*Attesting Officer*   *Acting Commissioner of Patents and Trademarks*